(12) United States Patent
Brees et al.

(10) Patent No.: US 8,172,537 B2
(45) Date of Patent: May 8, 2012

(54) EXTRUDED STATOR BLADE, STATOR WITH EXTRUDED BLADE, AND METHOD OF FORMING A STATOR ASSEMBLY WITH EXTRUDED BLADES

(75) Inventors: William Brees, Wooster, OH (US); Christopher Shamie, Wadsworth, OH (US)

(73) Assignee: Schaeffler Technologies AG & Co. KG, Herogenaurach (DE)

( * ) Notice: Subject to any disclaimer, the term of this patent is extended or adjusted under 35 U.S.C. 154(b) by 1324 days.

(21) Appl. No.: 11/820,573

(22) Filed: Jun. 20, 2007

(65) Prior Publication Data
US 2008/0229737 A1 Sep. 25, 2008

Related U.S. Application Data

(60) Provisional application No. 60/815,937, filed on Jun. 23, 2006.

(51) Int. Cl.
*F16H 41/28* (2006.01)
(52) U.S. Cl. .............. 416/197 C; 416/214 R; 60/362; 60/367
(58) Field of Classification Search ............ 416/180, 416/197 C, 213 R, 213 A, 214 R, 214 A; 60/360, 361, 362, 367, 341, 342, 343, 344, 60/345, 346
See application file for complete search history.

(56) References Cited

U.S. PATENT DOCUMENTS

| | | | |
|---|---|---|---|
| 2,598,620 A * | 5/1952 | Swift | 416/180 |
| 2,748,715 A * | 6/1956 | Mamo | 60/361 |
| 2,925,998 A * | 2/1960 | Hayes et al. | 415/137 |
| 4,820,120 A * | 4/1989 | Feuvrier et al. | 415/189 |
| 5,125,487 A * | 6/1992 | Hodge | 192/3.34 |
| 6,508,627 B2 | 1/2003 | Gerken et al. | |
| 6,675,941 B1 * | 1/2004 | Arhab et al. | 192/3.21 |
| 2004/0118113 A1 * | 6/2004 | Fukunaga et al. | 60/345 |

* cited by examiner

*Primary Examiner* — Edward Look
*Assistant Examiner* — Ryan Ellis
(74) *Attorney, Agent, or Firm* — Simpson & Simpson, PLLC

(57) ABSTRACT

The present invention broadly comprises a stator blade assembly for a torque converter stator including an inner ring having first openings; an outer ring having second openings; and extruded blades with first and second ends. The first end is disposed in a respective first opening and arranged to radially fix each blade with respect to the inner ring and the second end is disposed in a respective second opening and arranged to radially fix each blade with respect to the outer ring. In some aspects, the inner ring includes an inner circumferential surface and a portion of the first end extends radially inward past the inner surface and is in contact with the inner surface. In some aspects, the outer ring includes an outer circumferential surface and a portion of the second end extends radially outward past the outer surface and is in contact with the outer surface.

4 Claims, 11 Drawing Sheets

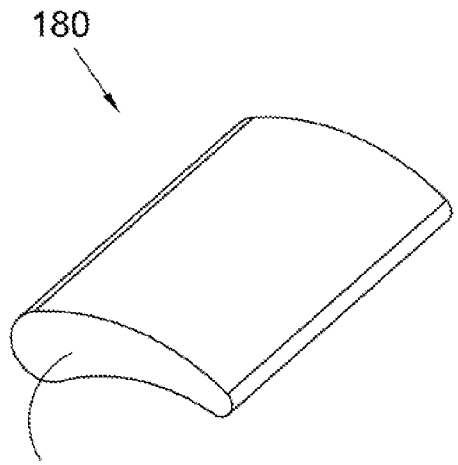
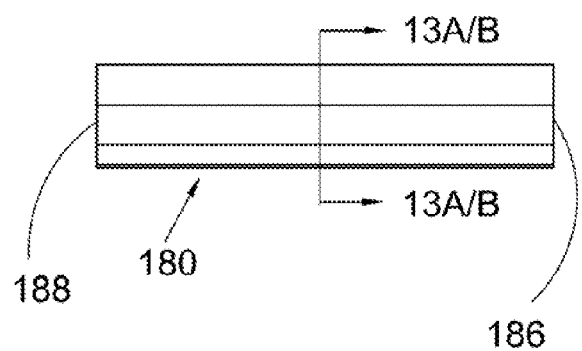
Fig. 11    Fig. 12
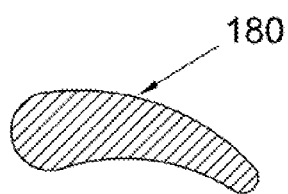 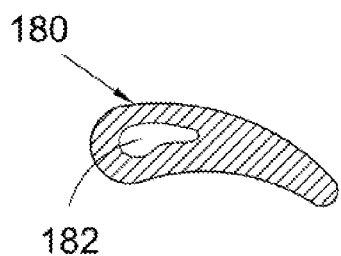
Fig. 13A    Fig. 13B
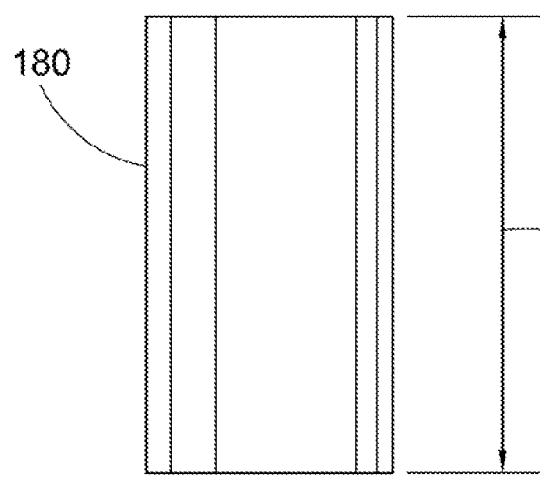
Fig. 14

US 8,172,537 B2

EXTRUDED STATOR BLADE, STATOR WITH EXTRUDED BLADE, AND METHOD OF FORMING A STATOR ASSEMBLY WITH EXTRUDED BLADES

CROSS-REFERENCE TO RELATED APPLICATIONS

This application claims the benefit under 35 U.S.C. § 119(e) of U.S. Provisional Application No. 60/815,937 filed Jun. 23, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a stator blade assembly with separately formed, extruded blades and a method of forming a stator blade assembly with extruded stator blades.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At high speed ratios, the torque converter is less efficient. The torque ratio of the torque converter gradually reduces from a high of about 1.8 to 2.2, to a torque ratio of about 1 as the turbine rotational speed approaches the pump rotational speed. Torque ratio of 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Maximum torque converter efficiency is limited to 92-93% based on losses in the fluid. Therefore torque converter clutch 49 is employed to mechanically connect the torque converter input to the output, improving efficiency to near 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

It is known to cast blade assemblies for a stator. Blades in cast assemblies can be formed to have a variety of desirable airfoil shapes. Unfortunately, casting a blade assembly is expensive. Also, the orientation and shape of the blades are limited by the requirements of the casting dies. Further, cast components are less amenable to further shaping operations.

Thus, there is a long-felt need for a stator blade assembly with blades having desirable airfoil shapes, but without the costs' associated with monolithic fabrication processes.

BRIEF SUMMARY OF THE INVENTION

The present invention broadly comprises a stator blade assembly for a stator in a torque converter including an inner ring having a plurality of first openings; an outer ring having a plurality of second openings; and a plurality of extruded blades having respective first and second ends. For each blade in the plurality of blades the first end is disposed in a respective first opening and arranged to fix each blade with respect to the inner ring in a first radial direction. The second end is disposed in a respective second opening and arranged to fix each blade with respect to the outer ring in a second radial direction. In some aspects, the inner ring includes an inner radial surface and a portion of the first end extends radially inward past the inner surface and is in contact with the inner surface. In some aspects, the first portion is cold headed or rolled to contact the inner radial surface. In some aspects, the first end includes an indent and the assembly includes a tab disposed in the indent and folded against the inner radial surface.

In some aspects, the outer ring includes an outer radial surface and a portion of the second end extends radially outward past the outer surface and is in contact with the outer surface. In some aspects, the portion is rolled to contact the outer radial surface. In some aspects, the second end includes an indent and the assembly includes a tab disposed in the indent and folded against the outer radial surface. In some aspects, at least one first blade in the plurality of blades includes a solid cross section, or an at least partially hollow cross section. In some aspects, the first end forms a press fit in the respective first opening and the second end forms a press fit in the respective second opening or the first end fills the respective first opening and the second end fills the respective, second opening.

The present invention also, broadly comprises a stator for a torque converter, including: an inner ring having a plurality of first openings and rotationally connected to a one-way clutch for the stator; an outer ring having a plurality of second openings; and a plurality of extruded blades having respective first and second ends. For each blade in the plurality of blades, the first end is disposed in a respective first opening and arranged to fix each blade with respect to the inner ring in a first radial direction. The second end is disposed in a respective second opening and arranged to fix each blade with respect to the outer ring in a second radial direction. In some aspects, the inner ring includes an inner circumferential surface and a portion of the first end extends radially inward past the inner surface and is formed to contact the inner surface.

In some aspects, the outer ring includes an outer circumferential surface and a portion of the second end extends radially outward past the outer surface and is formed to contact the outer surface. In some aspects, the one-way clutch is a roller one-way clutch with an outer race and the inner ring is rotationally connected to the outer race or the one-way clutch is a ratchet one-way clutch with a radially disposed plate and the inner ring is rotationally connected to the plate. In some aspects, the plate and the inner ring are integrally formed.

The present invention further broadly comprises a method for assembling a stator blade assembly for a torque converter, including the steps of: disposing a first end of each blade segment in a plurality of extruded blade segments in a respective opening in an inner ring of the stator; disposing a second end of each blade in a respective opening in an outer ring of the stator; operating on the first end of each blade segment so that each blade segment and the inner ring are fixed in a first radial direction; and operating on the second end of each blade segment so that each blade segment and the outer ring are fixed in a second radial direction. In some aspects, the respective opening in the inner ring comprises a periphery and operating on a first end of each blade segment includes operating on the first end so that the first end extends circumferentially beyond the periphery. In some aspects, operating on a first end of each blade segment includes cold heading the first end. In some aspects, the method includes inserting each blade through the respective opening in the inner ring.

In some aspects, the first end includes a portion extending radially inward beyond the inner ring and operating on the first end so that the first end extends circumferentially beyond the periphery includes: rotating the inner ring about a longitudinal axis for the assembly; applying a roller to the first portion; and moving the roller toward the inner ring. In some aspects, the first end includes an indent and the inner ring comprises an inner circumferential surface and operating on a first end of each blade includes inserting a tab into the first indent and folding the tab against the inner circumferential surface.

In some aspects, the respective opening in the outer ring comprises a periphery and operating on a second end of each blade segment includes operating on the second end so that the second end extends circumferentially beyond the periphery. In some aspects, the second end includes a portion extending radially outward beyond the outer ring. Then operating on the second end so that the second end extends circumferentially beyond the periphery includes: rotating the outer ring about a longitudinal axis for the assembly; applying a roller to the portion; and moving the roller toward the outer ring. In some aspects, the second end includes an indent and the outer ring comprises an outer circumferential surface and operating on a second end of each blade includes inserting a tab into the indent and folding the tab against the outer circumferential surface.

In some aspects, the inner ring includes a strip with longitudinal ends and the method includes wrapping the strip so that the longitudinal ends overlap, and fixedly securing the longitudinal ends. In some aspects, the outer ring includes a strip with longitudinal ends and disposing a second end of each blade in a respective opening in an outer ring of the stator includes wrapping the strip so that the second end passes through the respective opening in the outer ring; overlapping the longitudinal ends; and fixedly securing the longitudinal ends. In some aspects, the method includes press fitting the first end in the respective opening in the inner ring and press fitting the second end in the respective opening in the outer ring, or filling the respective first opening with the first end and filling the respective second opening with the second end.

It is a general object of the present invention to provide a torque converter stator having extruded blades.

It is another object of the present invention to provide a method for forming a torque converter stator using extruded blades.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 11 is a perspective side view of a present invention extruded stator blade;

FIG. 12 is a back view of the extruded stator blade shown in FIG. 11;

FIG. 13A is cross-sectional view of the extruded stator blade shown in FIG. 11 along line 13A/B in FIG. 12, illustrating a solid cross section;

FIG. 13B is cross-sectional view of the extruded stator blade shown in FIG. 11 along line 13A/B in FIG. 12, illustrating a partially hollow cross section;

FIG. 14 is a top view 'of the extruded stator blade' shown in FIG. 11; and,

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
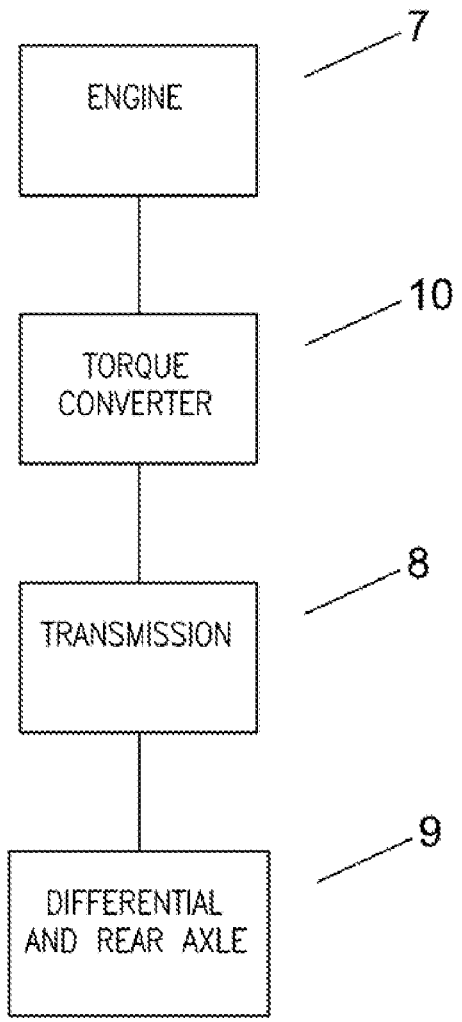
FIG. 1 is a general block diagram illustration of power flow in a motor vehicle, intended to help explain the relationship and function of a torque converter in the drive train thereof.
Figure 2:
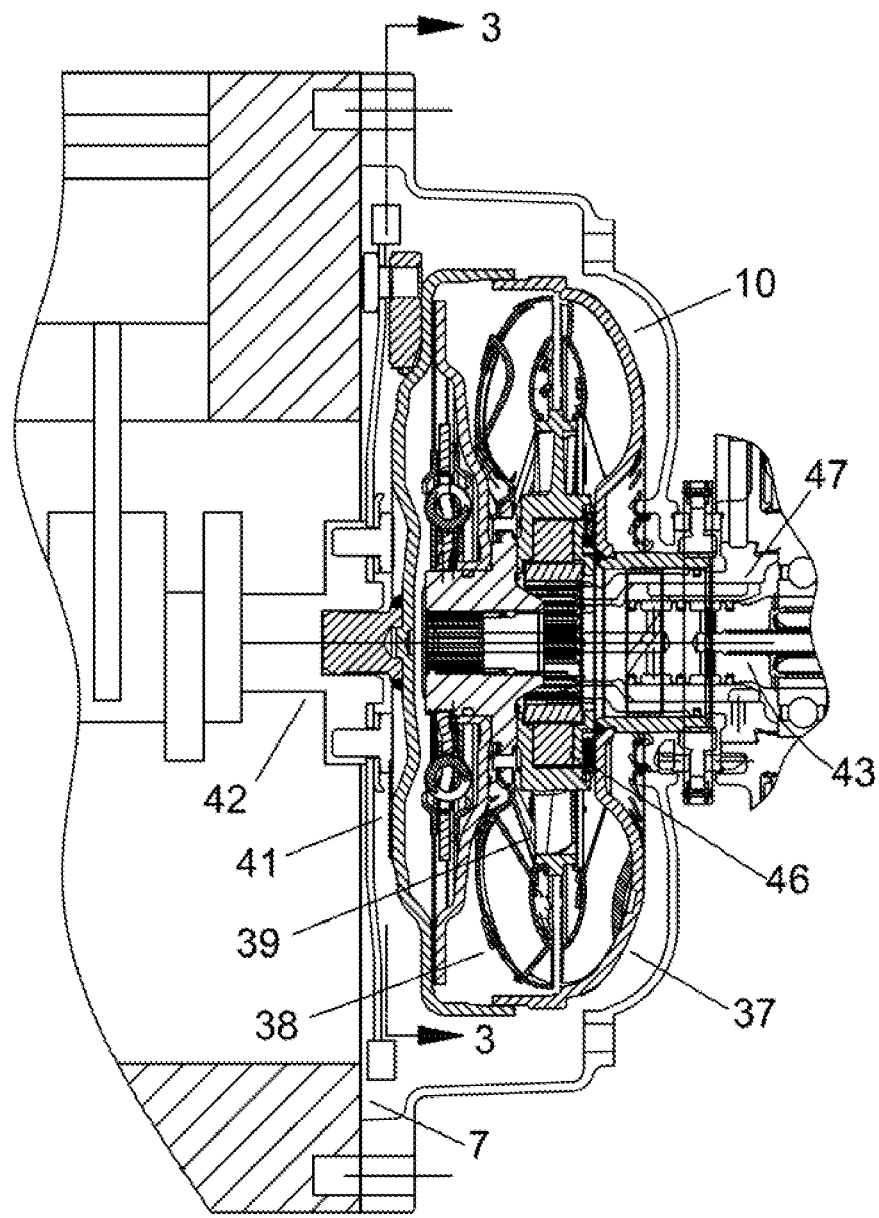
FIG. 2 is a cross-sectional view of a prior art torque converter, shown secured to an engine of a motor vehicle.
Figure 3:
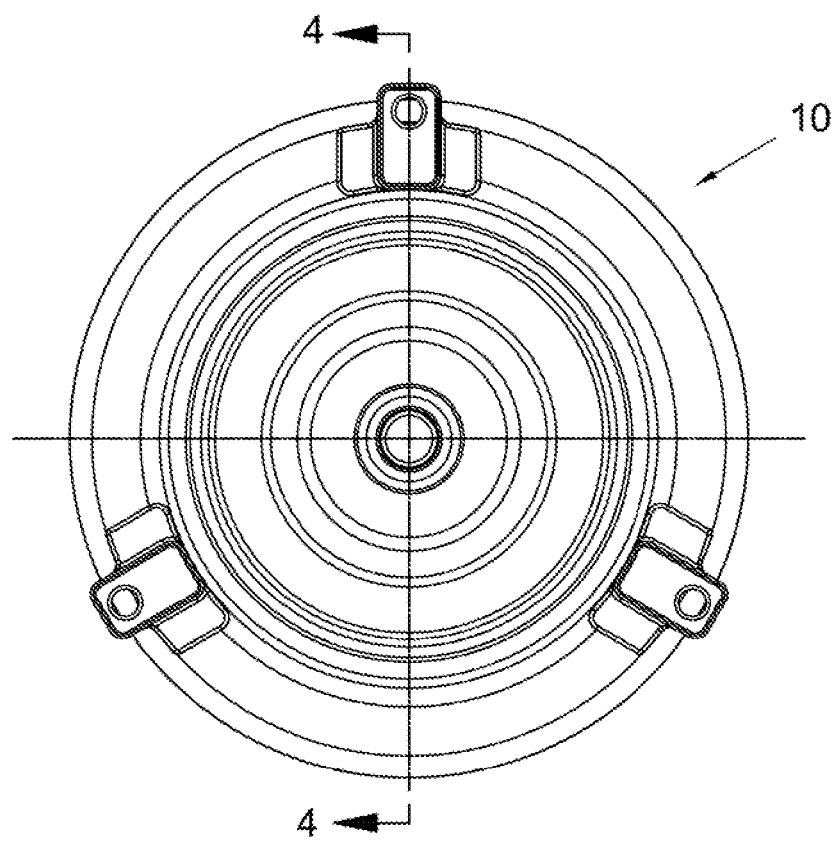
FIG. 3 is a left view of the torque converter shown in FIG. 2, taken generally along line 3-3 in FIG. 2.
Figure 4:
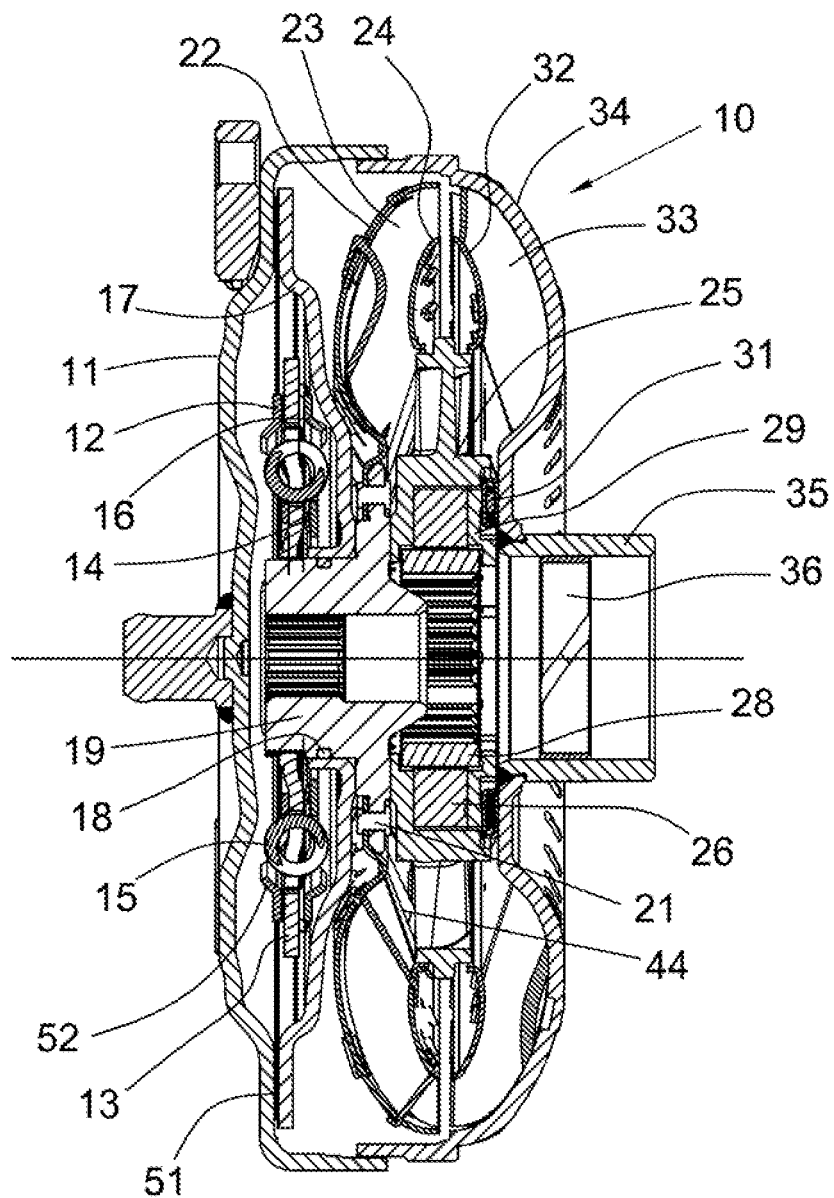
FIG. 4 is a cross-sectional view of the torque converter shown in FIGS. 2 and 3, taken generally along line 4-4 in FIG. 3.
Figure 5:
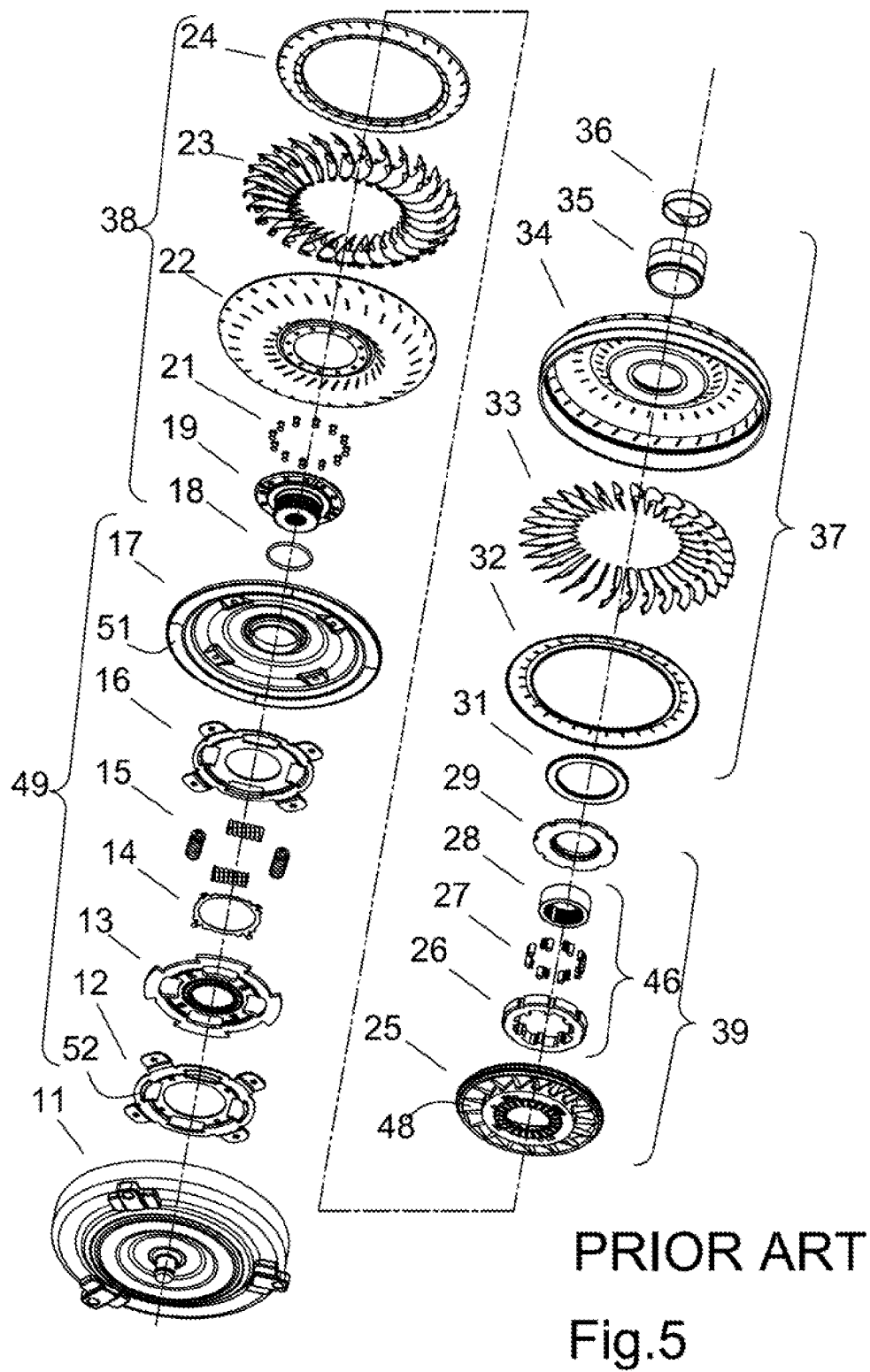
FIG. 5 is a first exploded view of the torque converter shown in FIG. 2, as shown from the perspective of one viewing the exploded torque converter from the left.
Figure 6:
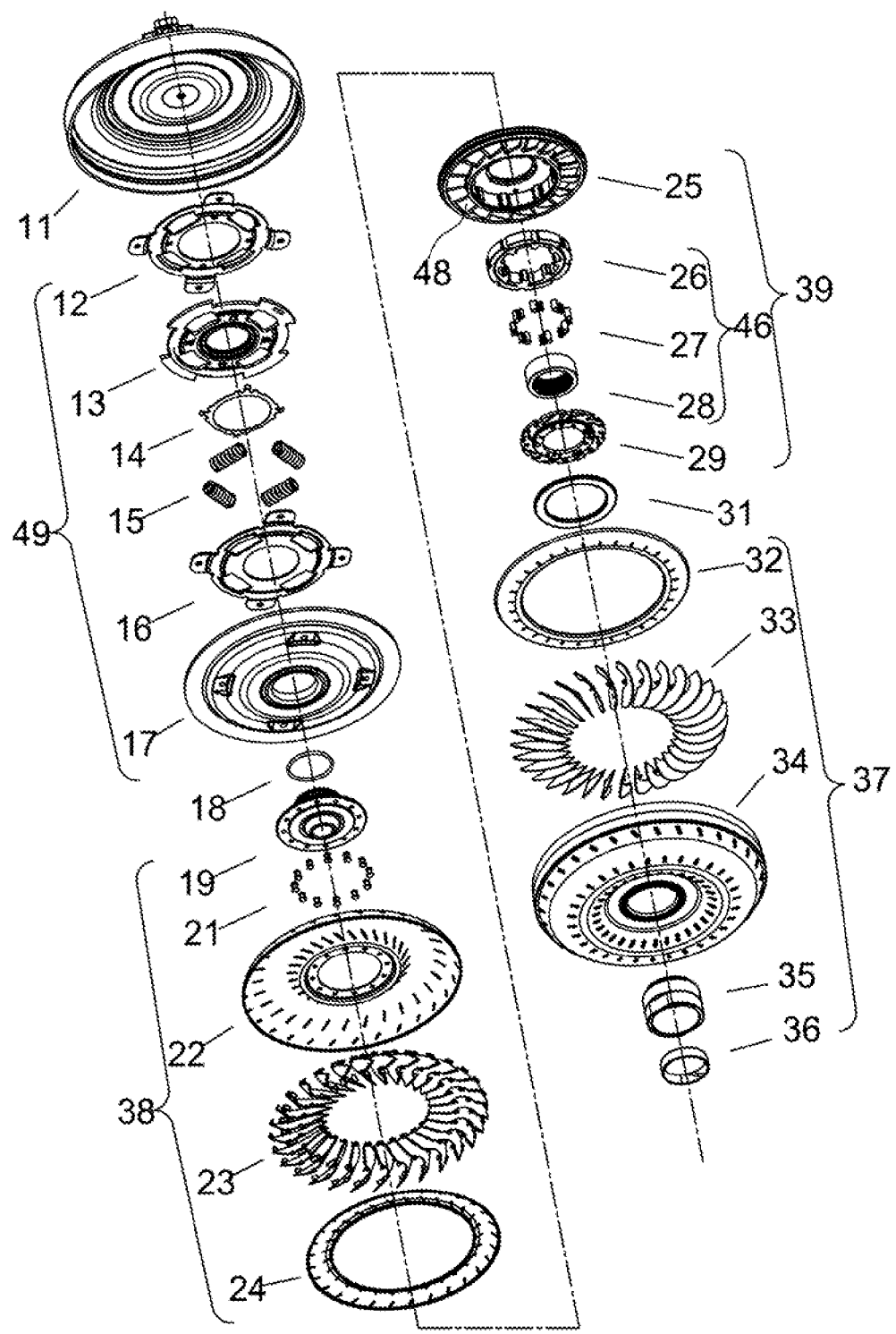
FIG. 6 is a second exploded view of the torque converter shown in FIG. 2, as shown from the perspective of one viewing the exploded torque converter from the right.
Figure 7A:
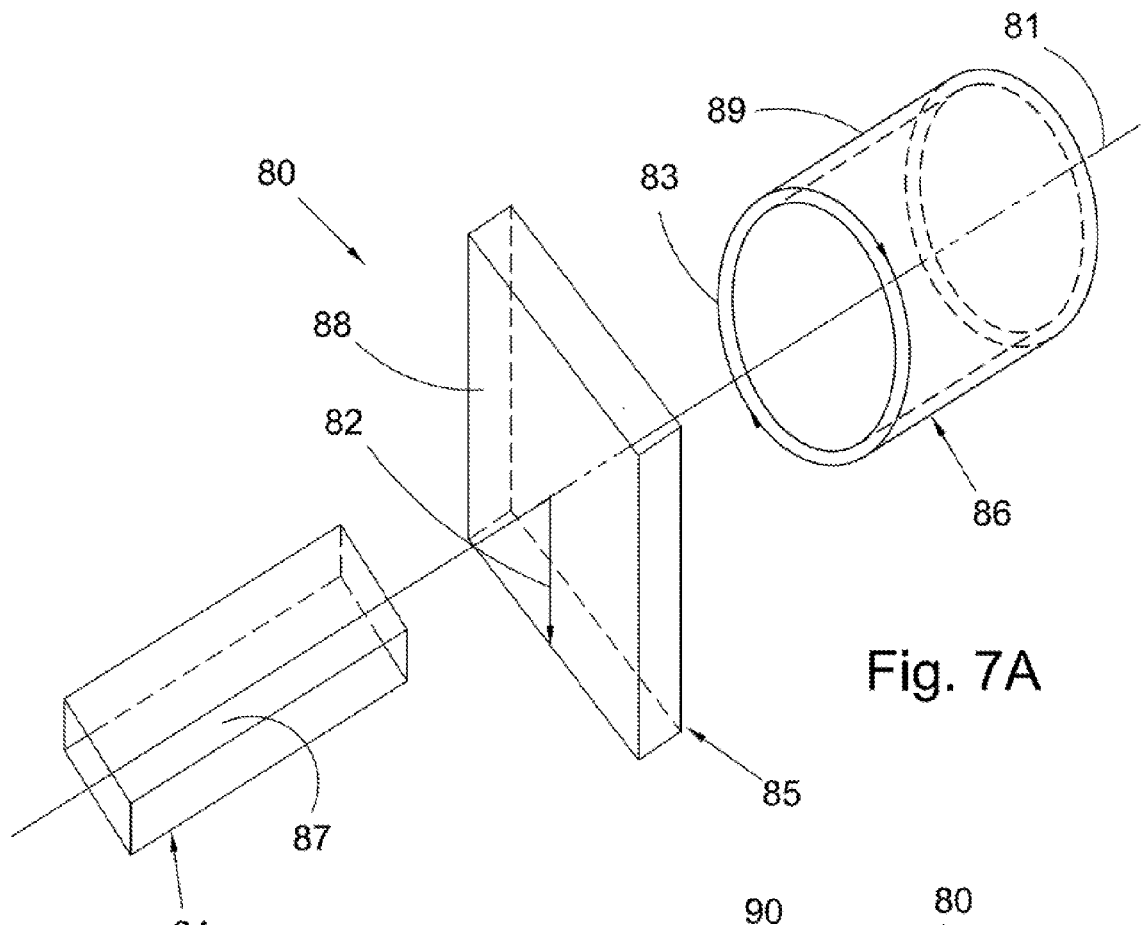
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), or circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
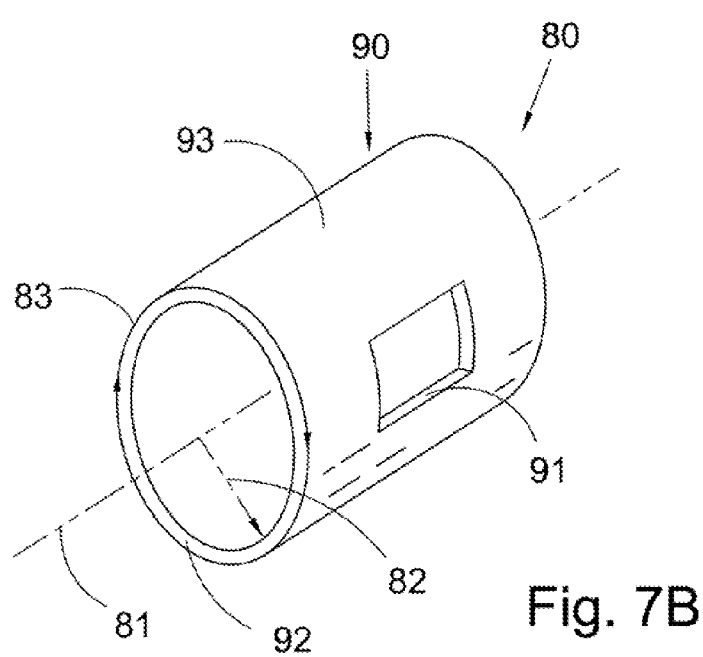
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
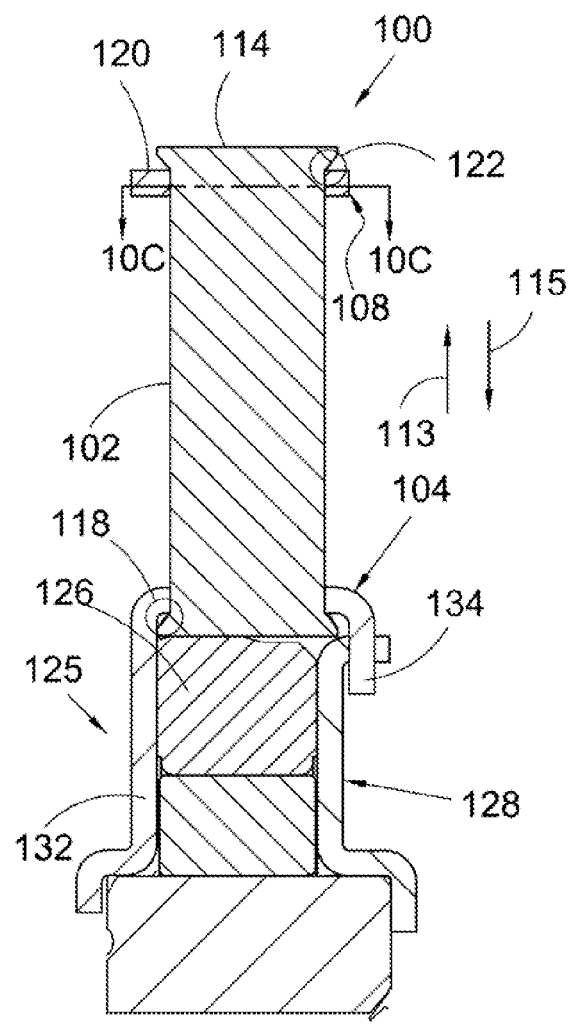
FIG. 8 is a partial cross-sectional view of a present invention stator blade assembly including a full cross section of a present invention blade.

FIG. 8 is a partial cross-sectional view of present invention stator blade assembly 100 including a full cross section of present invention blade 102.

Figure 9:
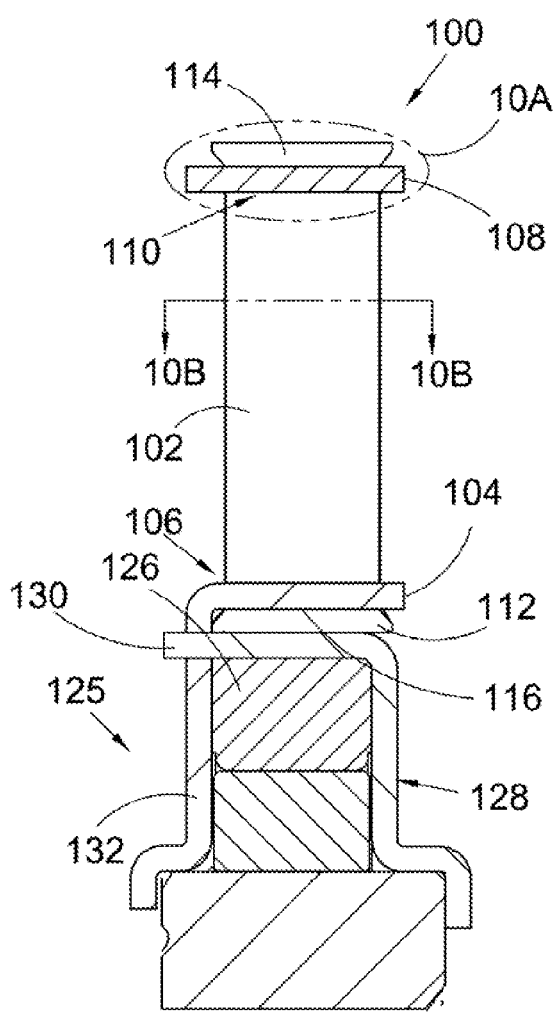
FIG. 9 is a partial cross-sectional view of the stator blade assembly shown in FIG. 8 between blades in the assembly.

FIG. 9 is a partial cross-sectional view of stator blade assembly 100 shown in FIG. 8 between blades in the assembly.

Figure 10A:
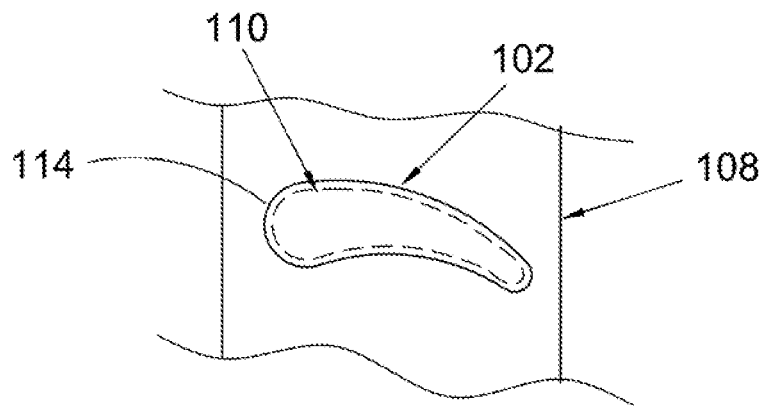
FIG. 10A is a partial top view of area 10A in FIG. 9.

FIG. 10A is a partial top view of area 10A in FIG. 9. The following should be viewed in light of FIGS. 8 through 10A. Stator blade assembly 100 includes inner ring 104 having a plurality of openings 106 and outer ring 108 with a plurality of openings 110. Assembly 100 also includes a plurality of extruded blades 102. Each blade has an end 112 and an opposing end 114. For each blade 102, end 112 is disposed in a respective opening 106. End 112 has been arranged, manipulated, or otherwise operated upon so that the end fixes the blade with respect to inner ring 104 in at least one radial direction, for example direction 113. By radially fixing, or securing, we mean that the blade and ring are connected such that the two are fixed with respect to radial motion. That is, the blade and the ring do not move independently of each other in the radial direction. Radially fixing two components does not necessarily limit relative movement in other directions. For example, it is possible for two components that are radially fixed to have axial movement with respect to each other via a spline connection. However, it should be understood that radially fixing does not imply that movement in other directions is necessarily present. The preceding explanation of radial connection is applicable to the discussions infra.

End 114 is disposed in a respective opening 110. End 114 has been arranged, manipulated, or otherwise operated upon so that the end fixes the blade with respect to outer ring 108 in at least one radial direction, for example direction 115. In some aspects, inner ring 104 includes inner circumferential surface 116 and a portion of end 112' extends radially inward past surface 116 and is in contact with the surface, for example, in area 118. In some aspects, the portion of end 112 is cold headed to contact circumferential surface 116 before blade 102 is inserted through ring 104. In some aspects, the portion is rolled to contact the inner circumferential surface after the blade is inserted through ring 104. In some aspects (not shown), end 112 includes an indent and assembly 100 includes a tab disposed in the indent and folded against surface 116 to radially fix blade 102 and ring 104.

In some aspects, outer ring 108 includes outer circumferential surface 120 and a portion of end 114 extends radially outward past surface 120 and is in contact with the surface, for example, in area 122. In some aspects, the portion of end 114 is rolled to contact the outer circumferential surface after end 114 is installed in ring 108. Thus, assembly 100 uses the configuration of ends 112 and 114, rather than separate mechanical fasteners, such as screws or rivets, to radially fix blade 102 and rings 104 and 108. In some aspects (not shown), end 114 includes an indent and assembly 100 includes a tab disposed in the indent and folded against surface 120 to radially fix blade 102 and ring 108.

Figure 10B:
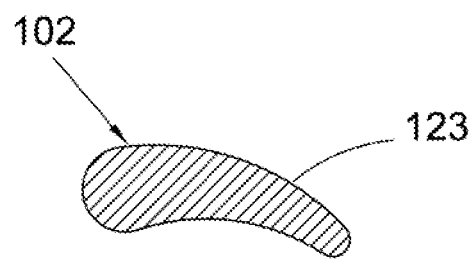
FIG. 10B is a cross-sectional view of the extruded stator blade along line 10B in FIG. 9.

FIG. 10B is a cross-sectional view of extruded stator blade 102 along line 10B in FIG. 9.

Figure 10C:
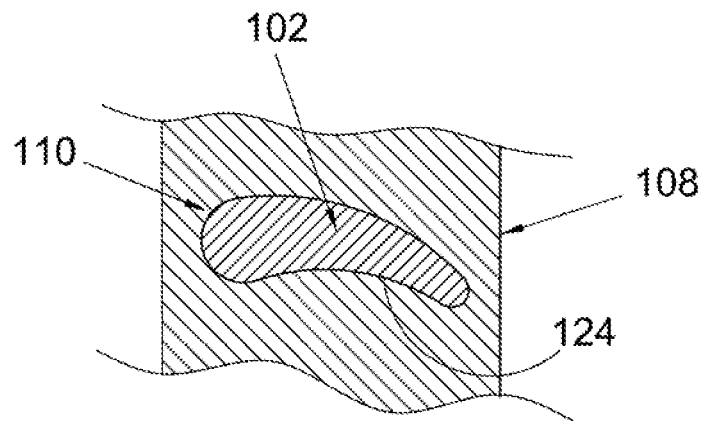
FIG. 10C is a cross-sectional view of the extruded stator blade and outer ring along line 10C in FIG. 8.

FIG. 10C is a cross-sectional view of extruded stator blade 102 and ring 108 along line 10C in FIG. 8. The following should be viewed in light of FIGS. 8 through 10C. In some aspects, end 114 is press fit into opening 110. In some aspects, end 114 fills opening 110, that is, circumference 123 of the blade mirrors circumference 124 of opening 110. That is, circumference 123 and circumference 124 are shaped the same and are in contact. This contact is slight enough to enable blade 102, in particular, end 114, to pass through opening 110. The extent of the compressive contact between the circumferences and the amount of force needed to pass the blade through the opening can be determined according to the requirements of a particular assembly. The preceding discussion is applicable to end 112 and opening 106 as well.

In some aspects, assembly 100 is located in a stator (not shown) for a torque converter (not shown). In some aspects, ring 104 is rotationally connected to one-way clutch 125 of the stator. By rotationally connected, or secured, we mean that the ring and clutch are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

In some aspects, clutch 125 is a roller clutch and ring 104 is rotationally connected to outer race 126 of the clutch. In some aspects, side plate 128 includes fingers 130 that extend axially through race 126 and rotationally connect plate 128 and race 126. The fingers also are rotationally connected to ring 104, in particular, to side plate segment 132. Tabs 134 of ring 104 also engage side plate 128. Thus, torque is transmitted from blades 102 to clutch 125 by ring 104 and plate 128. In some aspects (not shown), clutch 125 is a ratchet one-way clutch with a radially disposed, or annular, plate and inner ring 104 is rotationally connected to the radially disposed plate. In some aspects, inner ring 104 and the radially disposed plate are integrally formed. That is, the ring and the plate are a single piece of material.

FIG. 11 is a perspective side view of present invention extruded stator blade 180.

FIG. 12 is a back view of present invention extruded stator blade 180 shown in FIG. 11.

FIGS. 13A and 13B are cross-sectional views of extruded stator blade 180 shown in FIG. 11 along line 13A/B in FIG. 12.

FIG. 14 is a top view of extruded stator blade 180 shown in FIG. 11. The following should be viewed in light of FIGS. 8 through 14. A present invention blade is formed by extruding metal stock to form linear segments of the metal stock (not shown) having a specified airfoil shape, that is, a specified circumferential or cross-sectional shape. For example, airfoil form 181 in FIG. 11. It should be understood that blade 180 is not limited to the airfoil form shape shown and that any airfoil form shape known in the art can be used. In general, the airfoil shape is chosen to optimize the performance of a stator using the blade, however, other considerations, such as the strength of the blade or costs associated with extruding a particular shape are applicable.

In some aspects, for example, as shown in FIG. 13A, blades 180 are solid in cross section. In some aspects, for example, as shown in FIG. 13B, blades 180 are at least partially hollow in cross section. It should be understood that blades 180 are not limited to any particular size, shape, number, or orientation of hollow segments 182. It also should be understood that a present invention stator blade assembly can include combinations of solid and hollow blades. The linear segments are cut into blades, for example, blade 180, having a length 184. Blade 180 is not limited to any particular length 184. Blade 180 shows the shapes of ends 186 and 188 prior to the operations, discussed supra, that radially fix the blades to rings 104 and 108. As can be seen, no special or additional operations are required to prepare ends 186 and 188 for the operations. That is, a blade as configured following the cutting to length is ready for insertion into assembly 100.

Advantageously, extrusion enables the formation of a wide variety of blade airfoil shapes, some of which cannot be made using other blade forming processes, for example, stamping, or may be more expensive to make using other blade forming processes, for example, casting. Also, since the extruded blades are fabricated separately and then assembled to form a stator blade assembly, even more cost-effective processes and components can be used for other parts of the blade assembly. That is, the present invention enables a modular approach, in place of monolithic processes, that enables the use of the most cost-effective aspects of various component processes. Thus, in some aspects, assembly 100 is cost-effectively formed using the combination of extrusion to form blades with desirable airfoil shapes and stamping to form cost-effective stator rings. Also, extruded blades are amenable to further shaping operations. Thus, the cold heading and rolling operations noted supra are enabled.

Figure 15:
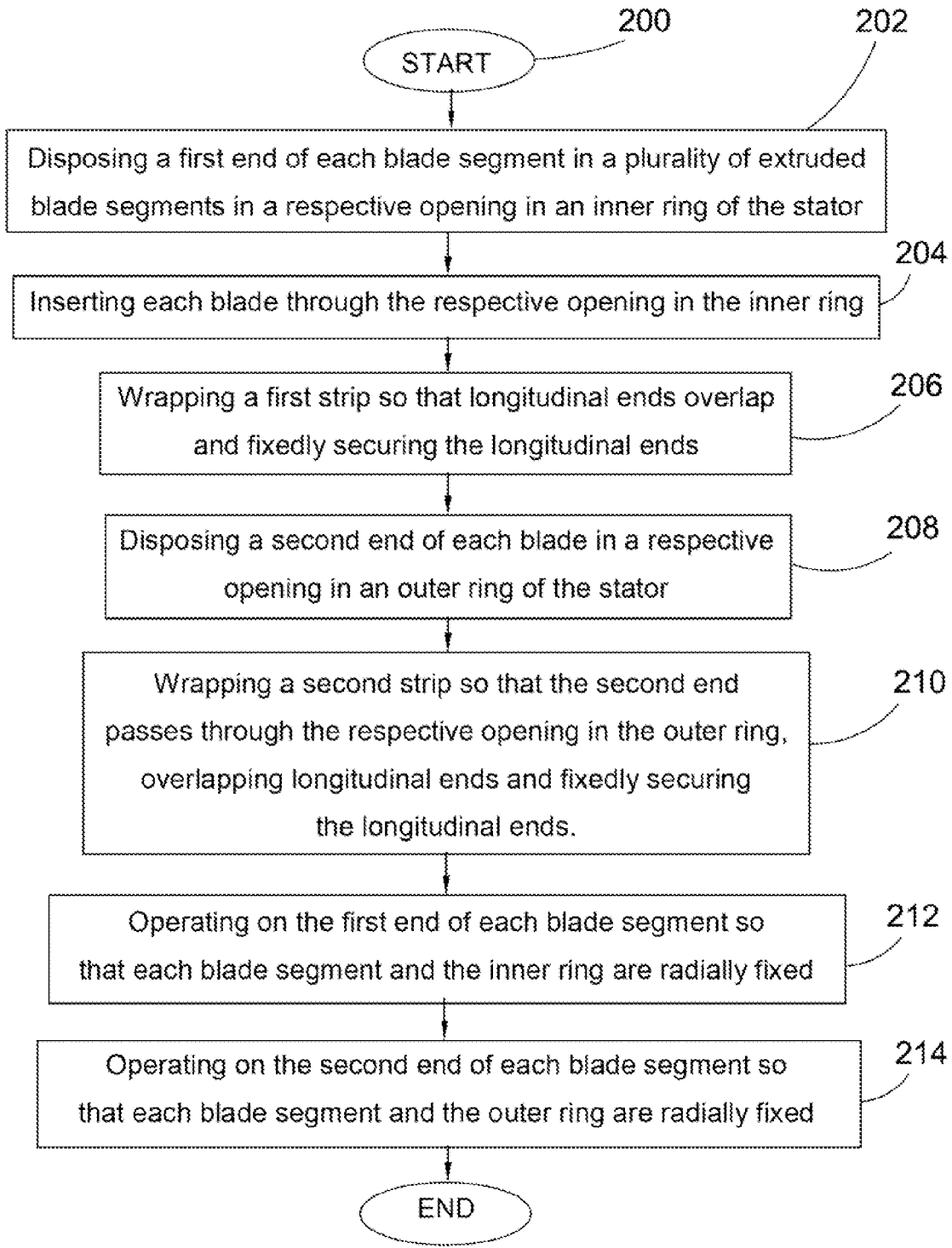
FIG. 15 is a flow chart illustrating a present invention method for assembling a stator blade assembly for a torque converter.

FIG. 15 is a flow chart illustrating a present invention method for forming a stator blade assembly in a torque converter. Although the method in FIG. 15 is depicted as a sequence of numbered steps for clarity, no order should be inferred from the numbering unless explicitly stated. The method starts at Step 200. Step 202 disposes a first end of each blade segment in a plurality of extruded blade segments in a respective opening in an inner ring of the stator. Step 208' disposes a second end of the each blade in a respective opening in an outer ring of the stator. Step 212 operates on the first end of each blade segment so that each blade segment and the inner ring are radially fixed in a first radial direction. Step 214 operates on the second end of the each blade segment so that each blade segment and the outer ring are radially fixed in a second radial direction.

In some aspects, the respective opening in the inner ring includes a first periphery and operating on a first end of each blade segment includes operating on the first end so that the first end extends circumferentially beyond the first periphery. In some aspects, operating on a first end of each blade segment includes cold heading the first end. In some aspects, the first end includes a first portion extending radially inward beyond the inner ring and operating on the first end so that the first end extends circumferentially beyond the first periphery includes: rotating the inner ring about a first longitudinal axis for the assembly; applying a first roller to the first portion; and moving the first roller toward the inner ring.

In some aspects, the first end further includes a first indent and the inner ring includes an inner circumferential surface and operating on a first end of each blade includes inserting a first tab into the first indent and folding the first tab against the inner circumferential surface. In some aspects, the respective opening in the outer ring includes a second periphery and operating on a second end of each blade segment includes operating on the second end so that the second end extends circumferentially beyond the second periphery. In some aspects, the second end includes a second portion extending radially outward beyond the outer ring and operating on the second end so that the second end extends circumferentially beyond the second periphery includes: rotating the outer ring about a second longitudinal axis for the assembly; applying a second roller to the second portion; and moving the second roller toward the outer ring. In some aspects, the second end includes a second indent and the outer ring includes an outer circumferential surface and operating on a second end of each blade includes inserting a second tab into the second indent and folding the second tab against the outer circumferential surface.

In some aspects, disposing a first end of each blade in a respective opening includes press fitting the first end in the respective opening and disposing a second end of each blade in a respective opening includes press fitting the second end in the respective opening. In some aspects, disposing a first end of each blade in a respective opening includes filling the respective first opening with the first end and disposing a second end of each blade in a respective opening includes filling the respective second opening with the second end.

Step 204 inserts each blade through the respective opening in the inner ring. In some aspects, the inner ring includes a first strip with first and second longitudinal ends and Step 206 wraps the first strip so that the first and second longitudinal ends overlap, and fixedly secures the first and second longitudinal ends. In some aspects, the outer ring includes a second strip with third and fourth longitudinal ends and Step 210 wraps the second strip so that the second end passes through the respective opening in the outer ring, overlaps the third and fourth longitudinal ends, and fixedly secures the third and fourth longitudinal ends.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A stator for a torque converter, comprising:
    a roller one-way clutch including:
        an outer race with first and second oppositely facing radially disposed sides;
        a first plate in contact with the first radially disposed side; and,
        a second plate, separate from the first plate, in contact with the second radially disposed side and in contact with the first radially disposed plate such that rotation of the first plate is fixed to rotation of the second plate;
    an inner ring having a plurality of first openings and rotationally connected to the roller one-way clutch;
    an outer ring having a plurality of second openings; and,
    a plurality of extruded blades having respective first and second ends, wherein for each blade in said plurality of blades said first end is disposed in a respective first opening and arranged to fix said each blade with respect to said inner ring in a first radial direction and said second end is disposed in a respective second opening and arranged to fix said each blade with respect to said outer ring in a second radial direction.

2. The stator of claim 1 wherein said inner ring further comprises an inner circumferential surface and a portion of said first end extends radially inward past said inner surface and is formed to contact said inner surface.

3. The stator of claim 1 wherein said outer ring further comprises an outer circumferential surface and a portion of said second end extends radially outward past said outer surface and is formed to contact said outer surface.

4. The stator of claim 1 wherein said one-way clutch is a roller one-way clutch with an outer race and said inner ring is rotationally connected to said outer race.

* * * * *